(12) United States Patent
Choi et al.

(10) Patent No.: US 8,053,071 B2
(45) Date of Patent: Nov. 8, 2011

(54) IMPACT ABSORPTION LAYER HAVING EXCELLENT IMPACT RESISTANCE AND FILM HAVING USE OF IMPACT ABSORPTION COMPRISING THE SAME

(75) Inventors: Hyun Seok Choi, Daejeon (KR); Sang Hyun Park, Daejeon (KR); Yeon Keun Lee, Daejeon (KR); Ik Hwan Cho, Busan (KR)

(73) Assignee: LG Chem, Ltd., Seoul (KR)

( * ) Notice: Subject to any disclaimer, the term of this patent is extended or adjusted under 35 U.S.C. 154(b) by 125 days.

(21) Appl. No.: 12/448,520

(22) PCT Filed: Jan. 9, 2008

(86) PCT No.: PCT/KR2008/000126
§ 371 (c)(1),
(2), (4) Date: Jun. 24, 2009

(87) PCT Pub. No.: WO2008/084978
PCT Pub. Date: Jul. 17, 2008

(65) Prior Publication Data
US 2010/0028608 A1 Feb. 4, 2010

(30) Foreign Application Priority Data
Jan. 9, 2007 (KR) .................. 10-2007-0002658

(51) Int. Cl.
*B32B 3/26* (2006.01)
(52) U.S. Cl. ............... 428/315.7; 428/319.3; 428/319.9; 428/315.5

(58) Field of Classification Search ............... 428/315.5, 428/315.7, 319.3, 319.7
See application file for complete search history.

(56) References Cited

U.S. PATENT DOCUMENTS

| 6,444,311 | B1 | 9/2002 | Friedman et al. | |
| 7,163,739 | B2 * | 1/2007 | Koike et al. | 428/343 |

(Continued)

FOREIGN PATENT DOCUMENTS

KR    10-2003-0001494    1/2003
(Continued)

OTHER PUBLICATIONS

Properties and Characteristics of Urethane Rubber Brochure, pp. 1483-1484, 2009.*

*Primary Examiner* — Hai Vo
(74) *Attorney, Agent, or Firm* — McKenna Long & Aldridge LLP

(57) ABSTRACT

There is provided a film having use of impact absorption capable of protecting a panel from impacts when the impacts are given to a display device, a window since it has an excellent ability to absorb impacts given to a surface of a display device, a window, or equivalent base plates. The impact absorption layer having a thickness of 30 μm or more has a hardness of 20 to 100 as measured at a room temperature using an Asker C hardness tester. Also, the film having use of impact absorption has excellent impact resistance and includes at least one layer, wherein the film includes at least one impact absorption layer having a hardness of 20 to 100 as measured at a room temperature using an Asker C hardness tester, the impact absorption layer having the total thickness of 30 μm or more.

3 Claims, 2 Drawing Sheets

U.S. PATENT DOCUMENTS

| | | | |
|---|---|---|---|
| 2002/0043608 A1* | 4/2002 | Nakata et al. | 248/560 |
| 2002/0151611 A1* | 10/2002 | Thoen et al. | 521/142 |
| 2006/0264522 A1 | 11/2006 | Nishikawa et al. | |
| 2008/0277054 A2 | 11/2008 | Jun et al. | |

FOREIGN PATENT DOCUMENTS

| | | |
|---|---|---|
| KR | 10-2006-0113492 | 11/2006 |
| KR | 10-2006-0130055 | 12/2006 |
| WO | WO 02/074532 | 9/2002 |

* cited by examiner

[Fig. 1]
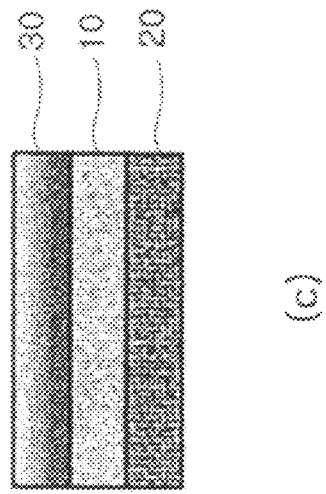
(c)
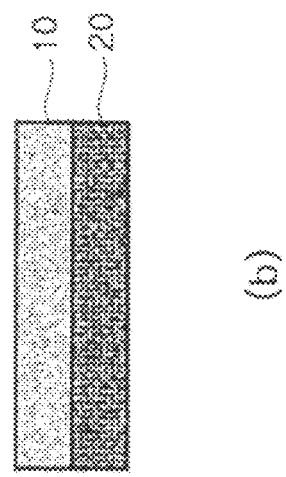
(b)
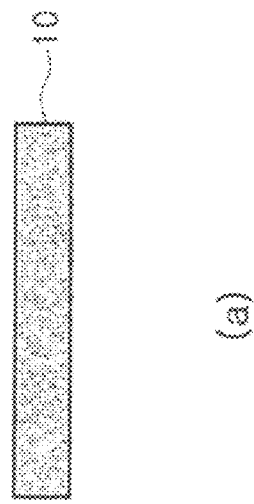
(a)

[Fig. 2]
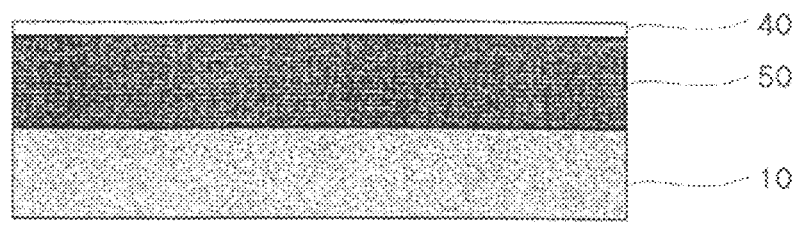

IMPACT ABSORPTION LAYER HAVING EXCELLENT IMPACT RESISTANCE AND FILM HAVING USE OF IMPACT ABSORPTION COMPRISING THE SAME

TECHNICAL FIELD

The present invention relates to impact absorption layer having excellent impact resistance and film having use of impact absorption comprising the same, and more particularly, to impact absorption layer and film having use of impact absorption capable of protecting a panel from impacts when the impacts are given to a display device or a window since it has an excellent ability to absorb impacts given to a surface of a brittle and transparent base plate such as a display device or a window.

BACKGROUND ART

With the current trends of the flat and thin display devices, the display devices have been gradually changed from Braun tube type (including a cathode ray tube (CRT)) into flat display devices such as a plasma display panel (PDP) or a liquid crystal display device (LCD).

Among the above-mentioned display devices, PDP is a display device in which fine cells arranged between thin glass plates are filled with a discharging gas. The light emission from the PDP is generated by making gas discharge with forming a strong electric field in the gas layer by using electrodes. As a result, ultraviolet rays are generated, and self-light emission occurs by the generated ultraviolet rays.

Also, LCD is a display device for displaying a desired image by filling liquid crystal materials between thin glass plates and forming an electric field in every pixel of an image to be displayed so as to control orientations of liquid crystal in different directions.

A conventional Braun tube-type display device includes a glass tube whose surface is somewhat spherical in shape due to the limitation on the shape of a shadow mask (of course, the flat Braun tube has been provided with the recent development of a tension type mask, but the old Braun tube has been produced to considerable numbers) and is integrally connected to lateral face. However, the PDP or LCD includes two facing glass plates and an image displaying material (gas or liquid crystal), and an edge side between the two glass plates is encapsulated with suitable materials. Therefore, the PDP or LCD is advantages in comparison with a conventional Brown tube-type display device since it has a thin thickness and superior flatness.

However, panels in the display devices such as the PDP or LCD, are very fragile when receiving impacts due to their inherent characteristics. That is, the conventional display devices are formed of relatively thicker glass, and have a slightly bulged surface to ensure a high vacuum that is formed inside the display devices as described above in the Braun tube, but the PDP or LCD does not have shape that the conventional display devices have. Therefore, the panels may be broken when a certain level of external impacts are applied to the panels since glass substrates installed in the panels have a thin thickness and a flat shape in the case of the PDP or LCD. In addition to the PDP or LCD, OLED or other light emitting devices have been used for the display devices, or many products including a conventional window may be broken when impacts are given to the products, and therefore the products need to be protected from the impacts.

In order to solve the above problems, glass-type filters in which a variety of functional films are attached to a semi-tempered glass have been developed and used in the art. However, the use of such semi-tempered glass results in the deteriorated optical characteristics of the display devices, and also runs right against the recent trends to lighten the weight of display device. Therefore, it is not also desirable to reinforce panels in the display devices in the above-mentioned manner.

Accordingly, there is an urgent need to develop a method for effectively reinforcing a display device without using the reinforcement method in which a glass substrate is used as described above.

DISCLOSURE OF INVENTION

Technical Problem

An aspect of the present invention provides an impact absorption layer having excellent impact resistance capable of protecting a display device, a glass substrate, or the like by absorbing external impacts, and a film having use of impact absorption comprising the same.

Technical Solution

According to an aspect of the present invention, there is provided an impact absorption layer having excellent impact resistance, wherein the layer having a thickness of 30 μm or more has a hardness of 20 or more as measured at a room temperature using an Asker C hardness tester.

In this case, the impact absorption layer may includes a pressure sensitive adhesive (PSA), or acryl-based, urethane-based, urethane acrylate-based, silicon-based or rubber-based compounds.

Also, micro bubbles having a diameter of 1 μm or less are present in the impact absorption layer in a density of 100 bubbles or less per cubic millimeter ($mm^3$) of the impact absorption layer.

According to another aspect of the present invention, there is provided a film having use of impact absorption having excellent impact resistance and comprising at least one layer, wherein the film comprises at least one impact absorption layer having a hardness of 20 or more as measured at a room temperature using an Asker C hardness tester, the impact absorption layer having the total thickness of 30 μm (micrometer) or more.

In this case, the impact absorption layer may includes a pressure sensitive adhesive (PSA), or acryl-based, urethane-based, urethane acrylate-based, silicon-based or rubber-based compounds.

Also, micro bubbles having a diameter of 1 μm or less are present in the impact absorption layer in a density of 100 bubbles or less per cubic millimeter ($mm^3$) of the impact absorption layer.

Furthermore, a film layer may be formed between the anti reflective layer and the impact absorption layer when the anti reflective layer is disposed in the outermost surface of the film having use of impact absorption, the film layer having a hardness of 60 or more as measured at a room temperature using an Asker C hardness tester.

Advantageous Effects

According to the present invention, provided are the film having use of impact absorption having excellent impact resistance without using a conventional separate semi-tempered glass substrate, and the impact absorption layer included in the film to, improve impact resistance in display devices, windows or other similar transparent substrate, and therefore it is possible to improve their durability.

BRIEF DESCRIPTION OF THE DRAWINGS

FIG. 1 is a cross-sectional view showing a film, in the stacked form, including an impact absorption layer according to one exemplary embodiment of the present invention.

FIG. 2 is a cross-sectional view showing that a high hardness layer is arranged between an anti reflective layer and an impact absorption layer to prevent scratches from being produced when the anti reflective layer is disposed in the outermost layer.

BEST MODE FOR CARRYING OUT THE INVENTION

Hereinafter, the present invention will be described in detail with reference to the accompanying drawings.

The present inventors have ardently attempted to develop a film having use of impact absorption having excellent impact resistance capable of protecting a display device by absorbing external impacts, and found that the impact resistance of the display device may be significantly improved when the film including at least one impact absorption layer is attached to a surface of the display device. Therefore, the present invention was completed, based on the abovementioned facts.

That is to say, the film according to the present invention is attached to a display device and composed of at least one layer, wherein one layer selected from the at least one layer functions as an impact absorption layer.

Also, the film having use of impact absorption according to the present invention includes an impact absorption layer, and has the same configuration as conventional optical compensation films, for example a retardation film, a viewing angle compensation film, etc. in LCD devices, a PDP filter in PDP devices, and the like, except that the film according to the present invention includes an impact absorption layer.

And, the film having use of impact absorption according to the present invention may be used to improve impact resistance in the Braun tube-type display device in addition to the PDP or LCD as described above. Of course, the Braun tube-type display device has a higher impact resistance than the PDP or LCD, but the film having use of impact absorption according to the present invention may be used in the display devices to further improve impact resistance, and therefore it is possible to prevent the display devices from being broken even when stronger impacts are given to the display devices.

The impact absorption layer included in the above-mentioned film having use of impact absorption according to the present invention preferably has a thickness of 30 μm (micrometer) or more. When the thickness of the impact absorption layer is less than 30 μm, the impact absorption layer has an impact absorbing ability but an insufficient thickness to completely absorb impacts when the impacts are given to the impact absorption layer, and therefore the unabsorbed impacts are delivered to a layer that is next to the impact absorption layer, which leads to the damages to display devices, windows, or other transparent base plates that the film according to the present invention needs to protect. In this case, the impact absorption layer is not necessarily formed into a single layer, but may consist of several layers over the entire film.

Furthermore, the impact absorption layer according to the present invention preferably has a thickness of 30 μm or more. Then, the impact absorption layer is stacked onto a surface of the glass substrate, and a hardness of the stacked impact absorption layer is measured at room temperature using an Asker C hardness tester. As a result, it is revealed that the stacked impact absorption layer has hardness of 20 to 100. The total thickness of the impact absorption layer including the film is preferably 30 μm or more, and more preferably 50 μm or more. When the hardness of the impact absorption layer is too low, the pressing and recovering characteristics of the impact absorption layer are poor. On the contrary, when the hardness of the impact absorption layer is too high, an impact absorbing ability is insignificant. The upper limit of the thickness of the impact absorption layer is not necessarily required. However, it is more preferable to define the upper limit of the thickness as 1 mm since the impact absorption layer decrease light transmission too much to be used at a display device and it is difficult to form a film if the layer is too thick.

At this time, when layers in the film have a hardness of 20 or more as measured at a room temperature using an Asker C hardness tester, the layers in the film may be used herein without any of limitations as impact absorption layer. Also, the thickness of the impact absorption layer does not mean a thickness of a single layer, but means the sum of the thicknesses of various impact absorption layers in the film, wherein the sum of the thicknesses of the impact absorption layers is desirably in a range of 30 μm or more.

The impact absorption layer, which meets the requirements as described above, includes urethane-based, urethane acrylate-based, acryl-based, silicon-based and rubber-based compounds, or a pressure sensitive adhesive (PSA).

Also, the impact absorption layer preferably has a modulus G' of $10^5$ to $10^8$ (100,000 to 100,000,000) when repeated twist loads are applied to the impact absorption layer.

Here, the shear stress by the twist load is applied at a frequency of 1 Hz. Materials that meets the above requirements may be selected from the abovementioned compounds, and silicon rubbers, acryl-based copolymers and the like are more preferred, but the present invention is not particularly limited thereto.

Also, a method for controlling a composition of a pressure sensitive adhesive that may be used in the present invention is, for example, described in detail, as follows. The pressure sensitive adhesive that may be used in the present invention includes 0 to 30 parts by weight of a hard acryl-based composition having a glass transition temperature (Tg) of 60° C.(Celsius) or more; 70 to 100 parts by weight of a soft acryl-based composition having Tg of 0° C. or less; and 1 to 20 parts by weight of a crosslinking agent. Here, representative examples of the used crosslinking agent may include diacrylate, triacrylate, tetraacrylate, and isocyanate-based crosslinking agents having at least two functional groups, and epoxy-based crosslinking agents having at least two functional groups, but the present invention is not particularly limited thereto. Also, the hard acrylate includes acrylic acid, methacrylate, etc, and the soft acrylate includes 2-ethyl hexyl acrylate, butylacrylate, iso-octylacrylate, etc., but the present invention is not particularly limited thereto. A polymerization initiator used to manufacture the adhesive includes photoinitiators such as benzophenone-based initiators. The photoinitiator may be used at a small amount that is required for the composition for the abovementioned pressure sensitive adhesive, and the amount of the photoinitiator may be easily deduced from amounts of conventionally used polymerization initiator. However, the photoinitiator is preferably present in a content of 0.1 to 3 parts by weight, based on 100 parts by weight of the sum of the hard acryl, the soft acryl and the crosslinking agent.

In addition to the abovementioned advantageous effects, the impact absorption layer in the film according to the present invention also preferably includes 100 or less micro bubbles having a diameter of 1 μm or less per square millimeter (mm$^3$). In this case, the impact absorption layer has more excellent impact absorbing ability under the same hardness condition, and therefore the present invention may provide a thinner impact absorption layer and a thinner film having use of impact absorption including the thinner impact absorption layer. In this case, when the number of the micro bubbles exceeds 100 bubbles/mm$^3$, the impact absorption layer may have very poor hardness. Also, even when the micro bubbles are not present at all, impact absorption layers may be expected to function as the impact absorption layer according to the present invention, as described above. Therefore, it is unnecessary to set the lowest limit for the number of the micro bubbles. In order to meet a buffering effect of the micro bubbles, the bubbles are preferably present in the number of 10 bubbles/mm or more.

The bubbles in the impact absorption layer are more preferably formed using a method as described later.

For example, 0.5% by weight or less of a surfactant and a high pressure homogenizing machine nay be used to disperse N$_2$ (g) or Ar (g) into a mixture including an acryl-based monomer and a crosslinking agent.

When the content of the surfactant exceeds 0.5% by weight, durability such as adhesive force and the like may be degraded under a high temperature or high humidity conditions, which leads to the productions of the poor products.

The high pressure homogenizing machine is mainly used to disperse groceries and cosmetics from a high pressure to an atmospheric pressure. A representative example of the high pressure homogenizing machine includes HS1004 (commercially available from Alphatech).

Hereinafter, a stacked structure of the film according to the present invention including the above-mentioned impact absorption layer will be described in detail with reference to the accompanying drawings.

As shown in FIG. 1, the film having use of impact absorption according to the present invention having excellent impact resistance may have a single layer structure of one impact absorption layer FIG. 1A) 10 or a multiple layer structure in which an impact absorption layer 10 is stacked on a substrate 20 FIG. 1B or FIG. 1C). To give an optical property to the film, optical films such as an optical compensation film in LCD or a PDP filter may be used as the substrate, or a PET film and the like may be simply used as the substrate.

Also, the impact absorption layer in the film according to the present invention may be a surface that is in contact with the air since the impact absorption layer is arranged in the outermost surface (FIG. 1B), or another layer may also be stacked on the outer wall of the impact absorption layer (FIG. 1C). In this case, an anti reflective layer 40 may be arranged the outermost layer in the outer wall of the impact absorption layer as shown in FIG. 2, depending on the use of the film. When the anti reflective layer 40 is arranged in the outermost layer, a layer 50 such as PET, polycarbonate, PMMA, acryl and PEN, is preferably formed in an inner surface of the anti reflective layer 40 wherein the layer 50 has a hardness of 60 or more as measured at a roam temperature using an Asker C hardness tester. This is why it is difficult to obtain a sound surface of the film since an anti reflective layer arranged in the outermost layer may be easily scratched when the soft impact absorption layer 10 is arranged right inside the anti reflective layer. Therefore, a film layer having a hardness of 60 or more is preferably further formed between the anti reflective layer and the soft impact absorption layer.

MODE FOR THE INVENTION

Hereinafter, exemplary embodiments of the present invention will now be described in more detail with reference to the accompanying drawings. However, the description proposed herein is just a preferable example for the purpose of illustrations only, not intended to limit the scope of the invention, so it should be understood that other equivalents and modifications could be made thereto without departing from the spirit and scope of the invention.

EXAMPLES

Example 1

An impact-resistant film for PDP was prepared by coating PET substrate with pressure sensitive adhesive in a thickness of 300 μm the pressure sensitive adhesive having a hardness of 95 as measured using an Asker C hardness tester. Then, the adhesive layer was disposed onto a PDP panel, and attached to the panel. In this case, the composition for a pressure sensitive adhesive was prepared with acryl-based copolymers, and then stacked according to a lamination process.

Example 2

A film is prepared in the same manner as in Example 1, except that a pressure sensitive adhesive in which bubbles were formed in an average density of 50 bubbles/mm$^3$ was used herein. The film was then attached to a PDP substrate.

Comparative Example 1

A film was prepared by applying an acryl-based adhesive between layers of conventional films in a thickness of 25 μm and attaching the conventional film to a surface of a PDP substrate, the conventional films including a near infrared ray shielding film, an electromagnetic wave shielding film, an anti reflective film and a color compensation film. The film was attached to a substrate in the same manner as in the Examples, and used for the Comparative example.

Comparative Example 2

A panel to which no film is attached was prepared for comparison.

Test of Impact Resistance

Each of the film prepared in the Examples 1 and 2 and Comparative examples 1 and 2 was attached to the front of a PDP panel, and the resulting PDP panels were measured for impact resistance by determining heights where the PDP panels are broken when a steel bead having a diameter of 10 mm and a weight of 8 g falls freely to a surface of the PDP panel.

The results are listed in the following Table 1.

TABLE 1

|  | Example 1 | Example 2 | Comparative example 1 | Comparative example 2 |
|---|---|---|---|---|
| Highest height when broken (m) | 2.1 | 4.5 | 0.9 | 0.5 |

As listed in the Table 1, it was revealed that the highest heights are disclosed in order of the films of Example 2, Example 1, Comparative example 1 and Comparative example 2. As a result, it was confirmed that the film according to the present invention including an impact absorption layer shows a buffering effect. Also, it was particularly seen that the film is most preferred when the buffering effect of the film is improved through the formation of bubbles in the impact absorption layer.

The invention claimed is:

1. An impact absorption layer used in a film for protection of a display panel,
   wherein the impact absorption layer has a thickness of 30 μm or more, has a hardness of 20 to 100 as measured at a room temperature using an Asker C hardness tester, and comprises micro bubbles and at least one selected from the group consisting of a pressure sensitive adhesive (PSA), acryl-based compound, urethane-based compound, urethane acrylate-based compound, silicon-based compound, and rubber-based compound;
   wherein the micro bubbles have a diameter of 1 μm or less and are present in the impact absorption layer in a density of 10 to 100 bubbles per cubic millimeter ($mm^3$).

2. A display device comprising:
   a display panel and a film,
   wherein the film has use of impact absorption and excellent impact resistance,
   wherein the film is attached to a surface of the display panel to protect the display panel, and comprises at least one impact absorption layer having a thickness of 30 μm or more and a hardness of 20 to 100 as measured at a room temperature using an Asker C hardness tester;
   wherein the at least one impact absorption layer comprises micro bubbles and at least one selected from the group consisting of a pressure sensitive adhesive (PSA), acryl-based compound, urethane-based compound, urethane acrylate-based compound, silicon-based compound, and rubber-based compound; and
   wherein the micro bubbles have a diameter of 50 μm or less and are present in the impact absorption layer in a density of 10 to 100 bubbles per cubic millimeter ($mm^3$).

3. The display device of claim 2, wherein a film layer is the film further comprises a high hardness layer formed between an anti reflective layer and the impact absorption layer when the anti reflective layer is disposed in the outermost surface of the film having use of impact absorption, the high hardness layer having a hardness of 60 or more as measured at a room temperature using an Asker C hardness tester.

* * * * *